(12) United States Patent
Cooke et al.

(10) Patent No.: US 8,328,432 B2
(45) Date of Patent: Dec. 11, 2012

(54) FIBER OPTIC CABLE ASSEMBLY

(75) Inventors: Terry L. Cooke, Hickory, NC (US); David L. Dean, Jr., Hickory, NC (US); Christopher S. Houser, Newton, NC (US); James M. Wilson, Granite Falls, NC (US)

(73) Assignee: Corning Cable Systems LLC, Hickory, NC (US)

( * ) Notice: Subject to any disclaimer, the term of this patent is extended or adjusted under 35 U.S.C. 154(b) by 260 days.

(21) Appl. No.: 12/953,207

(22) Filed: Nov. 23, 2010

(65) Prior Publication Data

US 2012/0128305 A1    May 24, 2012

(51) Int. Cl.
*G02B 6/38*    (2006.01)

(52) U.S. Cl. ............... 385/62; 385/53; 385/54; 385/58; 385/60; 385/69; 385/72; 385/75; 385/76; 385/78; 385/80; 385/81; 385/87; 385/91; 385/92

(58) Field of Classification Search ............... 385/53–94
See application file for complete search history.

(56) References Cited

U.S. PATENT DOCUMENTS

| | | | | |
|---|---|---|---|---|
| 4,822,131 A * | 4/1989 | Anderton | | 385/58 |
| 4,824,198 A * | 4/1989 | Anderton | | 385/69 |
| 6,234,683 B1 * | 5/2001 | Waldron et al. | | 385/78 |
| 6,604,867 B2 * | 8/2003 | Radek et al. | | 385/81 |
| 6,722,790 B2 * | 4/2004 | Caveney | | 385/81 |
| 6,899,468 B2 * | 5/2005 | Ngo et al. | | 385/87 |

* cited by examiner

*Primary Examiner* — Brian Healy
*Assistant Examiner* — Guy Anderson

(57) ABSTRACT

A fiber optic cable assembly includes a fiber optic connector and a fiber optic cable having at least one strength element, the connector and cable held together by a crimp band. The crimp band may include at least one lateral aperture on at least one end for inspecting the disposition of the strength element prior to crimping to ensure a uniform distribution of the strength element.

19 Claims, 4 Drawing Sheets

FIBER OPTIC CABLE ASSEMBLY

BACKGROUND

1. Field of the Disclosure

The disclosure relates generally to a fiber optic cable assembly and more particularly to a fiber optic cable assembly having a crimp band that has lateral apertures which may be used to insure uniform strength element distribution.

2. Technical Field

Fiber optic cable assemblies may include fiber optic connectors attached to fiber optic cables that use a fibrous strength element for tensile strength. To bind or secure the strength element to the connector metallic crimp bands are used. Conventionally, the strength element is arrayed about a portion, e.g., crimp body, of the connector and the crimp band is moved into position about the strength element and the crimp body. The crimp body is then closed, or crimped, about both the strength element and the crimp body. However, once the crimp band is in place the strength element is hidden from view and the distribution of the strength element is not known. This may cause an unevenly distributed strength element array to be unintentionally crimped to the connector, resulting in a fiber optic cable assembly that performs poorly under physical stress, for example, tensile stress or side loading, which may cause optical attenuation or a damaged optical fiber. A fiber optic cable assembly is needed that provides a way to determine the disposition of the strength element to ensure a uniform distribution about the crimp body prior to crimping.

SUMMARY

A fiber optic cable assembly is disclosed that includes at least one optical cable. The cable may have at least one optical fiber, a jacket, and at least one strength element. The assembly may also include at least one optical ferrule and a connector housing, the housing including a crimp body. The at least one strength element may be adjacent to the crimp body and held in place by a crimp band, the crimp band having first and second ends, a first area for engaging the crimp body and a second area for engaging the optical cable, the crimp band also having at least one lateral aperture located between the first end and second ends, the apertures extending through a thickness of the crimp band.

The crimp band may be disposed at least partially about the at least one strength element and at least partially about the crimp body, the at least one strength element being visible through the at least one lateral aperture for ensuring a substantially uniform distribution of the at least one strength element about the crimp body for securing the strength element to the crimp body.

A method of assembling the fiber optic cable assembly is also disclosed, the method including providing the disclosed fiber optic assembly and the disclosed crimp band. The method includes removing a length of the jacket to expose a portion of the at least one optical fiber and the strength element; inserting the at least one optical fiber into the ferrule, securing the fiber in the ferrule; disposing the strength element at least partially about the crimp body, the strength element being disposed in a substantially uniform manner.

Further, the method includes moving the crimp band along the cable until substantially adjacent to a portion of the connector housing, the crimp band further being disposed at least partially about both the strength element and the crimp body. The method also includes inspecting the strength element through the at least one lateral aperture to determine the disposition of the strength element and crimping the crimp band using a crimping tool.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
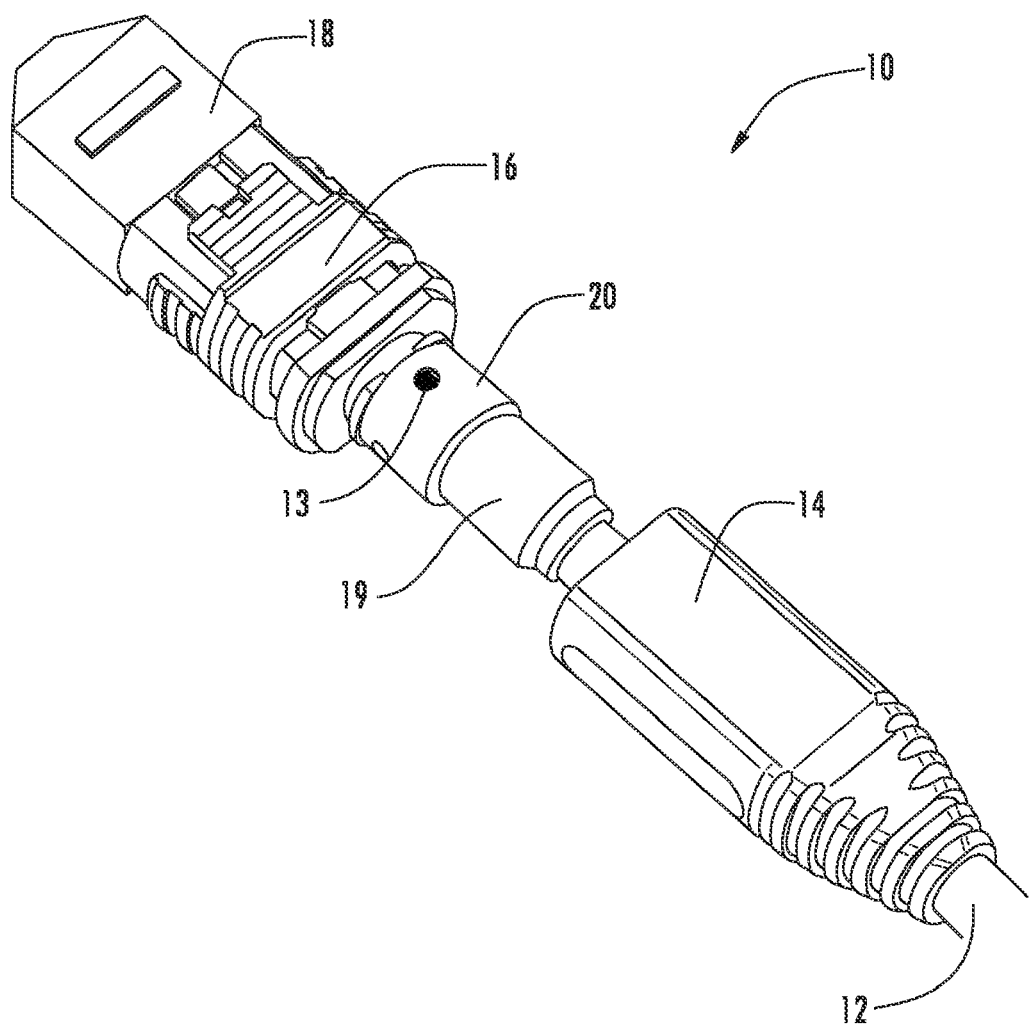
FIG. 1 is a partially exploded perspective view of a fiber optic connector.

Reference is now made in detail to the present preferred embodiments of the disclosure, examples of which are illustrated in the accompanying drawings. Whenever possible, identical or similar reference numerals are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to the embodiments described herein.

A fiber optic connector is disclosed that includes, for example, a connector housing, a fiber optic cable having at least one optical fiber, a boot, at least one fiber optic ferrule, and a crimp band for securing the cable to the connector housing. The crimp band may include, for example, lateral apertures disposed between a first end and a second end of the crimp band. The first end may engage a crimp body on the connector housing, for example, and the second end may engage a fiber optic cable. A transition portion may divide the crimp band into two different sections having differing widths. The transition portion may be a curved portion or a beveled portion that steps from one section to the other section.

The lateral apertures may be used to visibly determine the disposition of a cable tensile strength element about the crimp body, prior to crimping the crimp band, to ensure a substantially uniform distribution of the strength element. Substantially uniform distribution of the strength element about the crimp body may, for example, improve side loading performance and tensile pull performance of the connector, reducing losses that may occur under loading in the presence of more non-uniform distribution of the strength element. Such substantially uniform distribution may also prevent, for example, actual fiber breakage in the connector housing. In exemplary embodiments, the lateral apertures may be located near the first end for visually examining the strength elements. Additionally, lateral apertures may also be located near, for example, the second end for heat shrink retention.

Various embodiments will be further clarified by the following examples.

A fiber optic cable assembly 10 (FIG. 1) may include a fiber optic cable 12, a strain relief boot 14, an exemplary connector housing 16 and at least one fiber optic ferrule, for example, protected by a dust cap 18. Cable assembly 10 may include, for example, an MPO connector, an MTP® connector, an SC connector, or any other connector, for example, that may require a crimp band to secure a cable strength element. Cable 12 may include at least one strength element 13 for providing tensile strength to cable 12, strength element 13 engaging housing 16 via a crimp band 20 for securing cable 12 to housing 16. Crimp band 20, and any other crimp band embodiment disclosed herein may be made from, for example, an annealed brass, a nickel silver, a mild steel, or any other suitably ductile material that may be crimped, deformed or otherwise reshaped from a first form to a second form. A heat shrink 19 may, for example, secure a jacket of cable 12 to a portion of crimp band 20.

Figure 2:
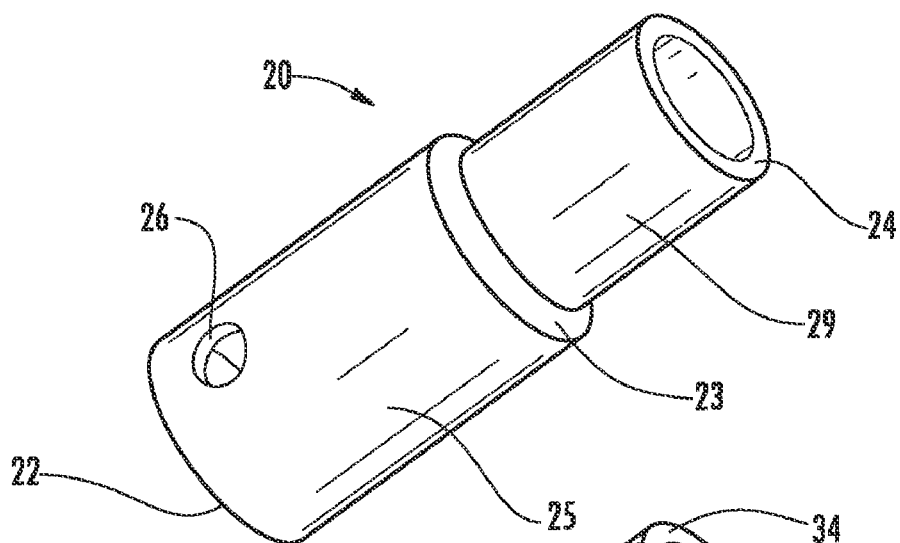
FIG. 2 is a perspective view of a crimp band for the fiber optic connector of FIG. 1.

In a first embodiment, crimp band 20 (FIG. 2) may include a first end 22 and a second end 24 with a passage therethrough. First end 22 may be associated with, for example a first area 25 and second end 24 may be associated with, for example, a second area 29. First area 25 and second area 29 may, for example, have different widths, or diameters, with a transition portion 23 disposed between first area 25 and second area 29. Transition portion 23 may, for example, include at least one bevel, at least one curve, or at least one step to generally transition from first area 25 to second area 29. At least one lateral aperture 26 may be located between first end 22 and second end 24, and in exemplary embodiments may be located between first end 22 and transition portion 23. The at least one lateral aperture may, for example, be selected from the group of forms being a round aperture, a slot aperture, a square aperture, a rhombic aperture, a rectangular aperture, a triangular aperture, an oval aperture, and combinations thereof Lateral aperture 26 may include, for example, a substantially round aperture 26 having an aperture axis substantially perpendicular to a long axis of crimp band 20. Lateral aperture 26 may be, for example, on one side of crimp band 20, passing through a thickness of crimp band 20 into the passage, and may also, in exemplary embodiments, pass entirely through crimp band 20, creating two such apertures 26 on substantially opposing sides.

Figure 3:
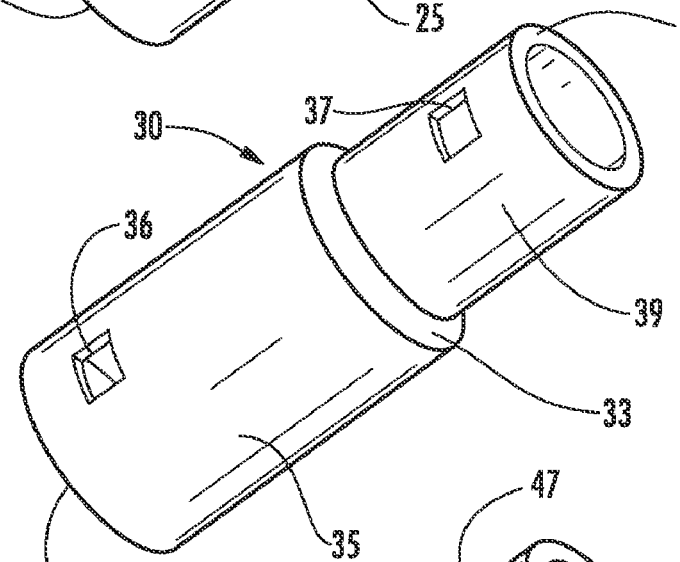
FIG. 3 is a perspective view of an alternate crimp band for the fiber optic connector of FIG. 1.

In an alternate embodiment, crimp band 30 (FIG. 3) may include a first end 32 and a second end 34 with a passage therethrough. First end 32 may be associated with, for example a first area 35 and second end 34 may be associated with, for example, a second area 39. First area 35 and second area 39 may, for example, have different widths, or diameters, with a transition portion 33 disposed between first area 35 and second area 39. Transition portion 33 may, for example, include at least one bevel, at least one curve, or at least one step to generally transition from first end 32 to second end 34. At least one lateral aperture 36 may be located between first end 32 and second end 34, and in exemplary embodiments may be located between first end 32 and transition portion 33. Lateral aperture 36 may include, for example, a substantially square or rectilinear aperture 36. Lateral aperture 36 may be, for example, on one side of crimp band 30, and may also be, in exemplary embodiments, a through aperture that passes entirely through crimp band 30, creating two such apertures 36 on substantially opposing sides. Crimp band 30 may also include, for example, a second lateral aperture 37, and in exemplary embodiments, opposing second lateral apertures 37 associated with second end 34.

Figure 4:
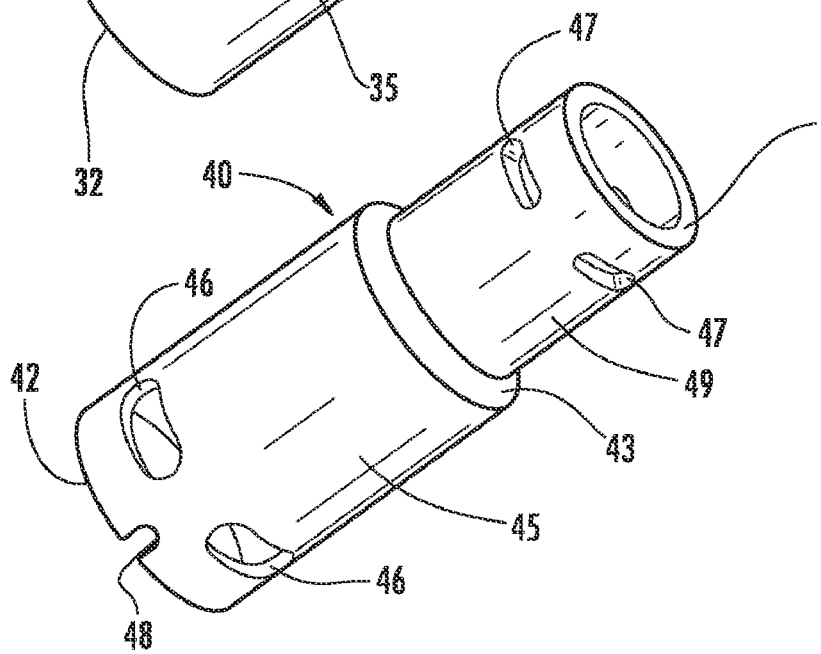
FIG. 4 is a perspective view of another alternate crimp band for the fiber optic connector of FIG. 1.

In another alternate embodiment, crimp band 40 (FIG. 4) may include a first end 42 and a second end 44 with a passage therethrough. First end 42 may be associated with, for example a first area 45 and second end 44 may be associated with, for example, a second area 49. First area 45 and second area 49 may, for example, have different widths, or diameters, with a transition portion 43 disposed between first area 45 and second area 49. Transition portion 43 may, for example, include at least one bevel, at least one curve, or at least one step to generally transition from first end 42 to second end 44. At least one lateral aperture 46 may be located between first end 42 and second end 44, and in exemplary embodiments may be located between first end 42 and transition portion 43. Lateral aperture 46 may include, for example, a slot aperture 46 array, including multiple slot apertures 46. Crimp band 40 may also include, for example, a second lateral aperture 47, and in exemplary embodiments, opposing second lateral apertures 47 associated with second end 44. In further exemplary embodiments, crimp band 40 may include an anti-rotation notch 48 that may engage, for example, a corresponding protrusion on a connector housing. Anti-rotation notch 48 may assist in keeping a uniformly distributed strength element from being, for example, twisted during handling and processing until crimp band 40 may be crimped tight onto the crimp body. Notch 48 may be found on any crimp band embodiments, and is not exclusive to the embodiment of crimp band 40.

In another alternate embodiment, crimp band 50 (FIG. 5) may include a first end 52 and a second end 54 with a passage therethrough. First end 52 may be associated with, for example a first area 55 and second end 54 may be associated with, for example, a second area 59. First area 55 and second area 59 may, for example, have different widths, or diameters, with a transition portion 53 disposed between first area 55 and second area 59. Transition portion 53 may, for example, include at least one bevel, at least one curve, or at least one step to generally transition from first end 52 to second end 54. At least one lateral aperture 56 may be located between first end 52 and second end 54, and in exemplary embodiments may be located between first end 52 and transition portion 53. Lateral aperture 56 may include, for example, a substantially round aperture 56 having an aperture axis substantially perpendicular to a long axis of crimp band 50. Lateral aperture 56 may be, for example, a lateral aperture 56 array around the periphery of crimp band 50 including, for example, from two to six apertures 56. Crimp band 50 may also include, for example, a second lateral aperture 57, and in exemplary embodiments, an array of second lateral apertures 57 associated with second end 54.

Figure 5:
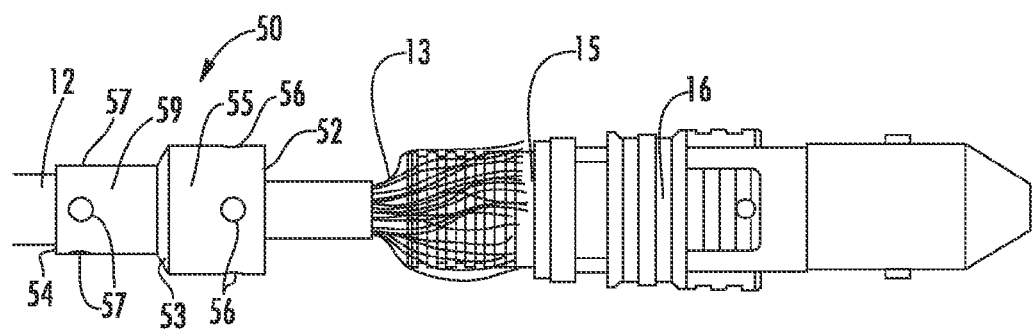
FIG. 5 is an assembly view of yet another alternate crimp band being applied to a fiber optic connector.

In an exemplary embodiment, crimp band 50 may be adjacent to, for example, disposed about cable 12 (FIG. 5). Cable 12 may be processed, for example, for attaching to connector housing 16. For example, a portion of the jacket material may be stripped off to expose at least one optical fiber and a length of strength element 13. The optical fiber may be secured to the optical ferrule. Strength element 13 may be a fibrous strength element selected from the group consisting of fiberglass, aramid fibers or yarns, steel mesh, carbon fibers and combinations thereof Strength element 13 may be adjacent to, for example, disposed at least partially about or at least partially arrayed about a crimp body 17, found on connector housing 16. Substantially uniform distribution of at least a portion of strength element 13 about crimp body 15 may, for example, improve side loading performance and tensile pull performance of connector 10, reducing losses that may occur under loading in the presence of more non-uniform distribution of strength element 13. Such substantially uniform distribution may also prevent, for example, actual fiber breakage in connector housing 16.

Figure 6:
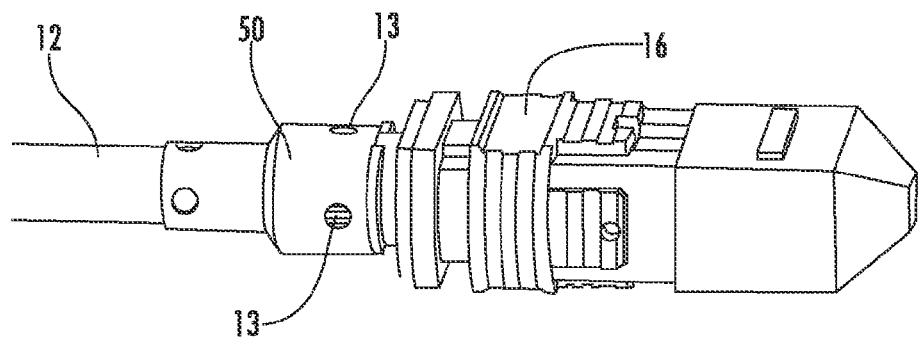
FIG. 6 is a side perspective view of the assembly of FIG. 5.

Crimp band 50 may be moved, for example axially along cable 12 until it is substantially adjacent to, for example, a shoulder of connector housing 16, placing first area 55 at least partially about strength element 13 and crimp body 17. Lateral apertures 56 may be used to, for example, visibly determine the disposition of strength element 13 about crimp body 15, prior to crimping crimp band 50, to ensure a substantially uniform distribution of strength element 13 (FIG. 6). More apertures 56, as in an array of apertures 56, enables more complete visualibity of the disposition of strength element 13 around crimp body 15. After the disposition of strength element 13 has been determined, crimp band 50 may be crimped, for example, using a manual crimping tool or a powered crimping tool.

Figure 7:
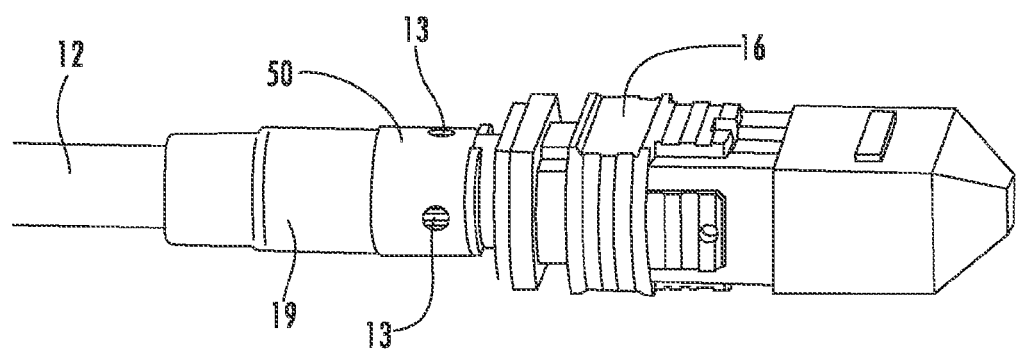
FIG. 7 is a side perspective view of the assembly of FIG. 5.

Having been previously threaded onto cable 12, a section of a suitable heat shrink 19 may, for example, be moved onto second end 54, substantially covering second area 59 and apertures 57 (FIG. 7). Upon activation by a heat source, heat shrink 19 may contract about a portion of second area 59 and a portion of the jacket of cable 12. The contraction of heat shrink 19 may force a portion of the heat shrink tube at least partially into apertures 57 for additional axial retention. Strain relief boot 14 may be moved into a final position over crimp band 50.

Figure 8:
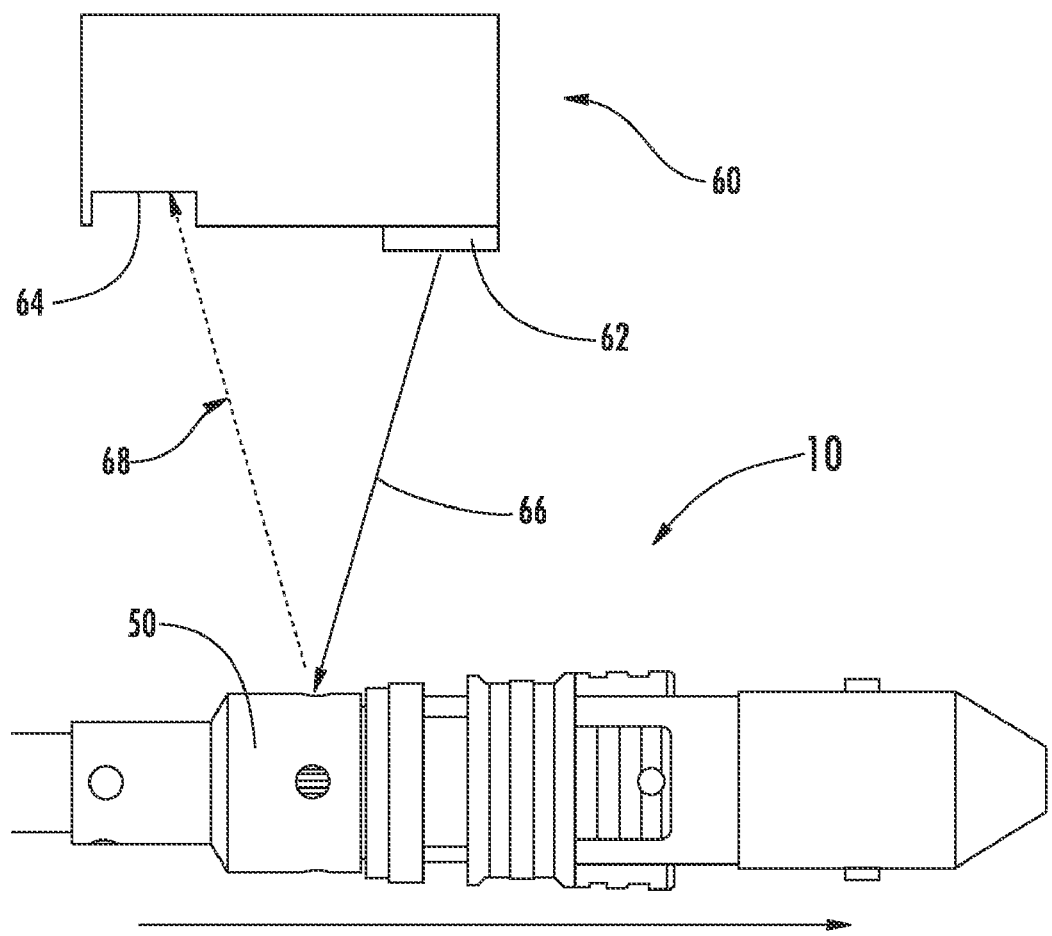
FIG. 8 is a side view of the assembly of FIG. 5 under inspection.

In some embodiments, the amount of strength element that may be present in apertures 56 may be manually determined by visual inspection. In other exemplary embodiments, assembly 10 may be assembled, for example, using an automated process that may include, for example, an automated inspection station 60 (FIG. 8). Station 60 may include, for example, a transmitter 62 and a receiver 64. Transmitter 62 and receiver 64 may, for example, be selected from the group consisting of a laser transmitter and receiver, an ultrasonic transmitter and receiver, a light source and a photodiode, and combinations thereof A transmitted signal 66 may be emitted from transmitter 62 generally toward aperture 56. In exemplary embodiments, the distribution of strength element 13 may determine, for example, the intensity, quality, wavelength, or cohesiveness of a return signal 68 that reaches receiver 64. Automated inspection station 60 may indicate, for example, the absence, presence, or relative amount of strength element 13 by, for example, a readout, a display, an indicator light, or a feedback signal to another part of the automation line, a readout, a display, or an indicator light. In further exemplary embodiments, a plurality of automated inspection stations 60 may be included to inspect the disposition of strength element 13 through the plurality of apertures 56. For example, the readings taken by the plurality of stations 60 may be compared to each other, to a set point or control reading, and the comparison used to determine the disposition of strength element 13 in all of apertures 56 to ensure the uniform distribution of strength element 13.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber optic cable assembly, the assembly comprising:
   at least one optical cable, the cable having at least one optical fiber, a jacket, and at least one strength element;
   at least one optical ferrule;
   a housing, the housing including a crimp body, the at least one strength element being adjacent to the crimp body;
   a crimp band, the crimp band including first and second ends, a first area for engaging the crimp body and a second area for engaging the optical cable, the crimp band having at least one lateral aperture located between the first end and second ends, the apertures extending through a thickness of the crimp band,
   the crimp band being disposed at least partially about the at least one strength element and at least partially about the crimp body, the at least one strength element being visible through the at least one lateral aperture for ensuring a substantially uniform distribution of the at least one strength element about the crimp body for securing the strength element to the crimp body.

2. The assembly of claim 1, the at least one lateral aperture being selected from the group of forms being a round aperture, a slot aperture, a square aperture, a rhombic aperture, a rectangular aperture, a triangular aperture, an oval aperture, and combinations thereof.

3. The assembly of claim 1, the crimp band including a plurality of lateral apertures with at least some of the apertures arranged in at least one radial array substantially equally spaced around the periphery of the crimp band.

4. The assembly of claim 3, the first area having a first width and the second area having a second width of about the same or smaller width than the first width, the crimp band further including a transition portion between the first area and the second area, the at least one radial array of lateral apertures associated with the first area.

5. The assembly of claim 1, the at least one strength element being a fibrous strength element.

6. The assembly of claim 1, the crimp band including at least one other lateral aperture, the at least one other lateral aperture being associated with the second end.

7. The assembly of claim 6, the assembly including a heat shrink tube associated with a portion of the cable and the one other lateral aperture associated with the second area of the crimp band, a portion of the the heat shrink tube contracting at least partially into the one other lateral aperture for additional axial retention for the heat shrink tube.

8. A fiber optic cable assembly, the assembly comprising:
   at least one optical cable, the cable having at least one optical fiber, a jacket, and a fibrous strength element;

at least one optical ferrule;

a housing, the housing including a crimp body;

a crimp band, the crimp band including first and second ends, a first area for engaging the crimp body and a second area for engaging the optical cable, the crimp band having at least one lateral aperture located between the first end and the second end for securing the at least one strength element to the crimp body.

9. The assembly of claim 8, the crimp band being disposed at least partially about the at least one strength element and at least partially about the crimp body, the at least one strength element being visible through the at least one lateral aperture for ensuring a substantially uniform distribution of the at least one strength element about the crimp body for securing the strength element to the crimp body.

10. The assembly of claim 8, the at least one lateral aperture selected from the group of forms being a round aperture, a slot aperture, a square aperture, a rectangular aperture, a triangular aperture, an oval aperture, and combinations thereof.

11. The assembly of claim 8, the crimp band including a plurality of lateral apertures with at least some of the apertures arranged in at least one radial array substantially equally spaced around the periphery of the crimp band.

12. The assembly of claim 11, the at least one strength element being disposed at least partially about the crimp body.

13. The assembly of claim 11, the first area having a first width and the second area having a second width of about the same or smaller width than the first width, the crimp band further including a transition portion between the first area and the second area, the at least one radial array of lateral apertures associated with the first area.

14. The assembly of claim 8, the at least one strength element being a fibrous strength element.

15. A method of assembling a fiber optic cable assembly, the method comprising:

providing a fiber optic assembly, the assembly including at least one optical ferrule and a connector housing for receiving the ferrule, the housing including a crimp body;

providing an optical cable, the cable including at least a jacket, at least one optical fiber and at least one strength element;

providing a crimp band, the crimp band including a first area for engaging the crimp body and a second area for engaging the optical cable, the crimp band having at least one lateral aperture extending through a thickness of the band located between the first area and the second area;

threading the crimp band axially along the cable;

removing a length of the jacket to expose a portion of the at least one optical fiber and the strength element;

inserting the at least one optical fiber into the ferrule, securing the fiber in the ferrule;

disposing the strength element at least partially about the crimp body, the strength element being disposed in a substantially uniform manner;

moving the crimp band along the cable until substantially adjacent to a portion of the connector housing, the crimp band further being disposed at least partially about both the strength element and the crimp body;

inspecting the strength element through the at least one lateral aperture to determine the disposition of the strength element; and crimping the crimp band using a crimping tool.

16. The method of claim 15, including threading a section of heat shrink tubing along the cable.

17. The method of claim 16, including axially moving the section of heat shrink tubing along the cable until substantially adjacent to a transition portion of the crimp band.

18. The method of claim 17, including applying heat to the heat shrink tubing to secure the heat shrink to both the cable jacket and the crimp band.

19. The method of claim 15, including providing at least one automated inspection station for automatically inspecting the strength element through the at least one lateral aperture to determine the disposition of the strength element, the automated inspection station including a transmitter and a receiver.

* * * * *